July 29, 1947.	E. H. PAGE	2,424,769
HELICOPTER HAVING FOLDING ROTOR
Filed March 5, 1945   5 Sheets-Sheet 5
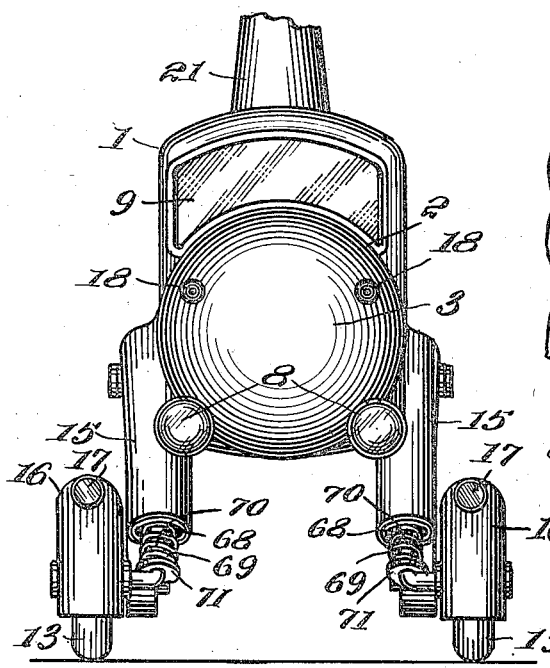
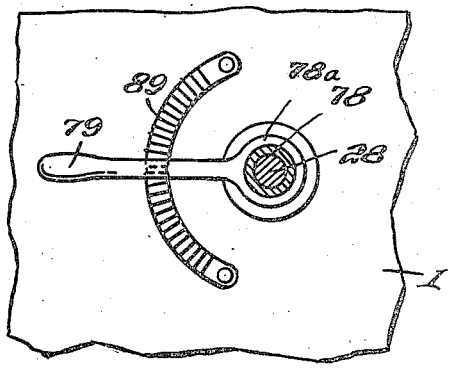
INVENTOR.
Edward H. Page,
BY Victor J. Evans & Co.
ATTORNEYS Patented July 29, 1947

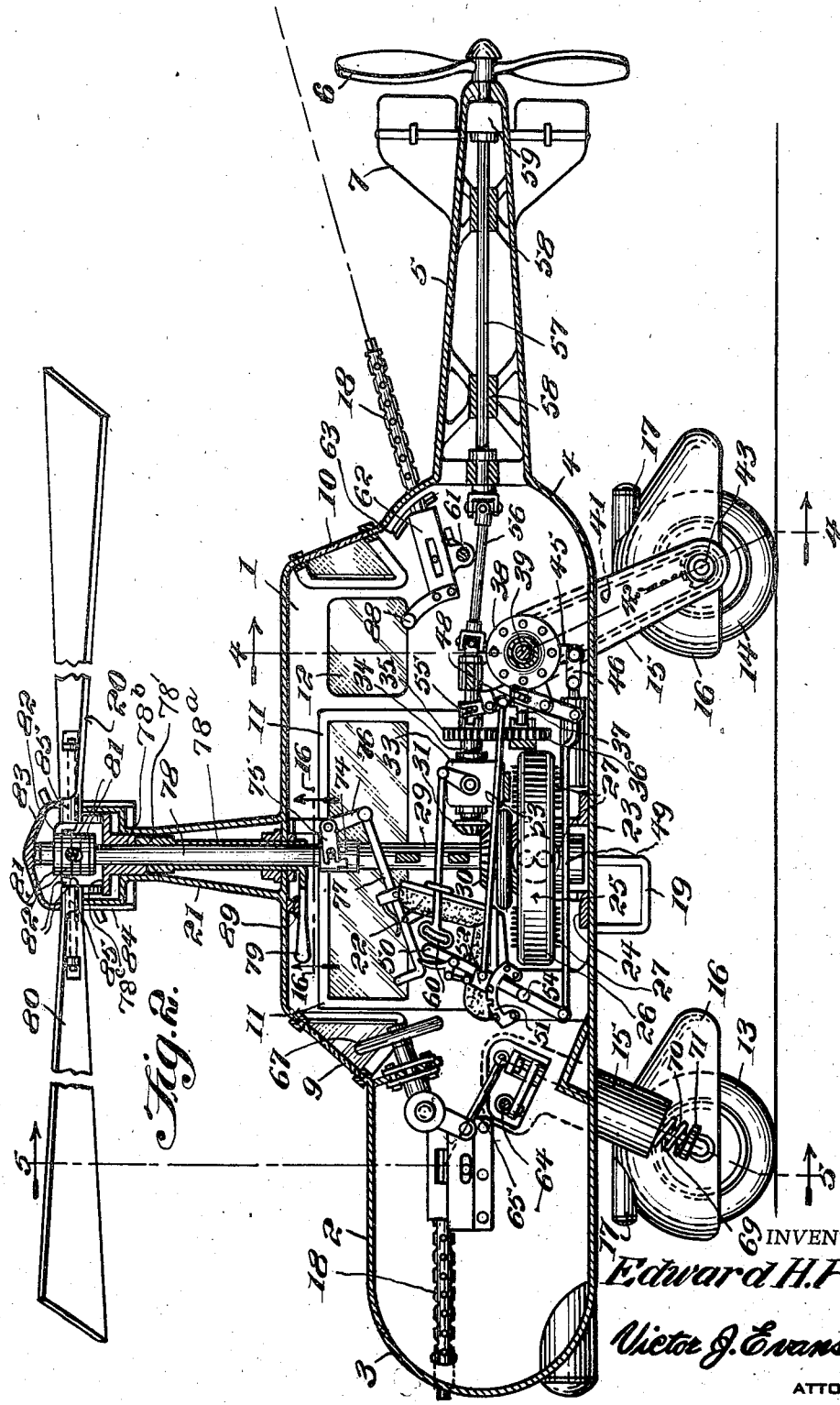

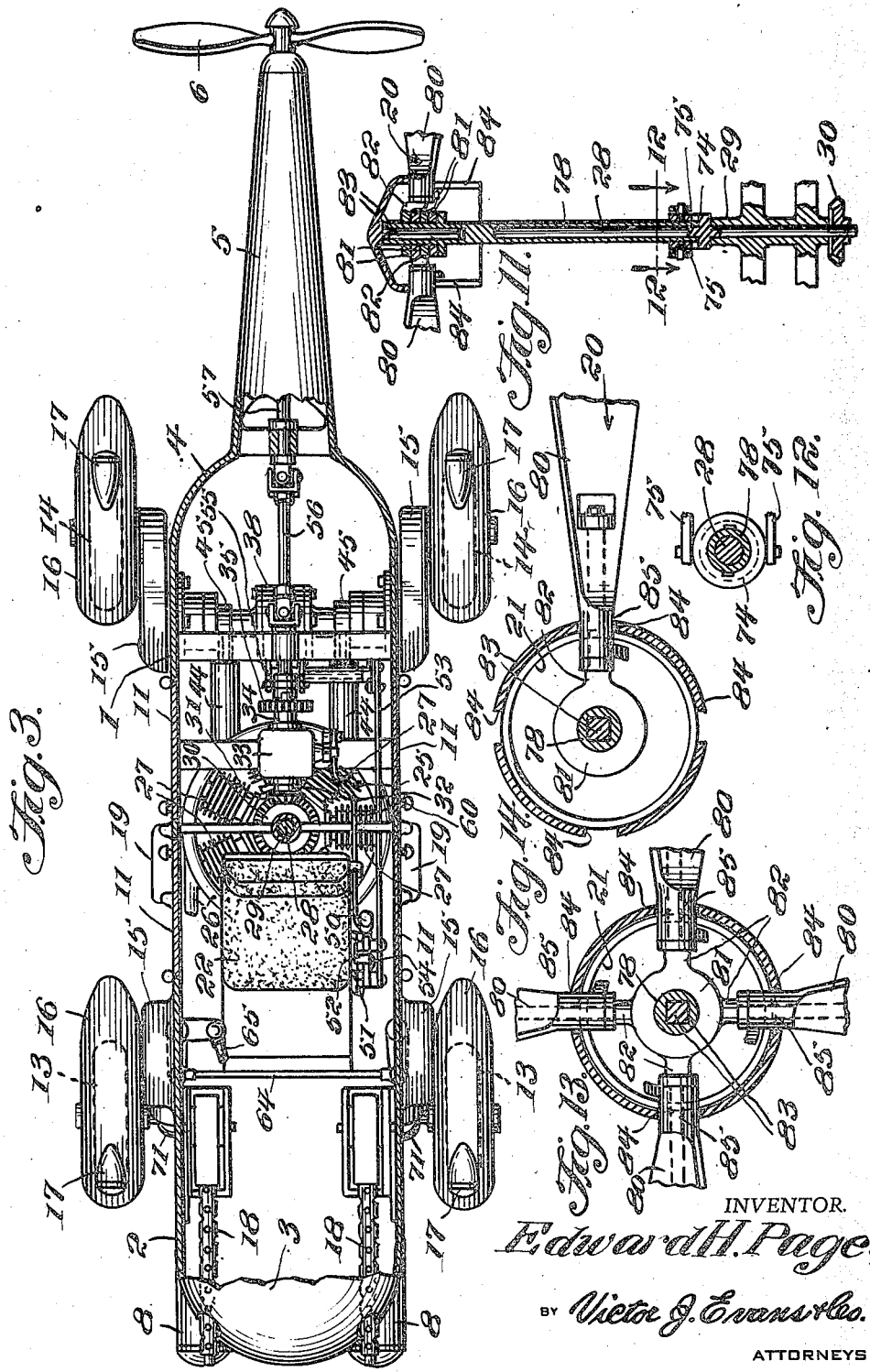

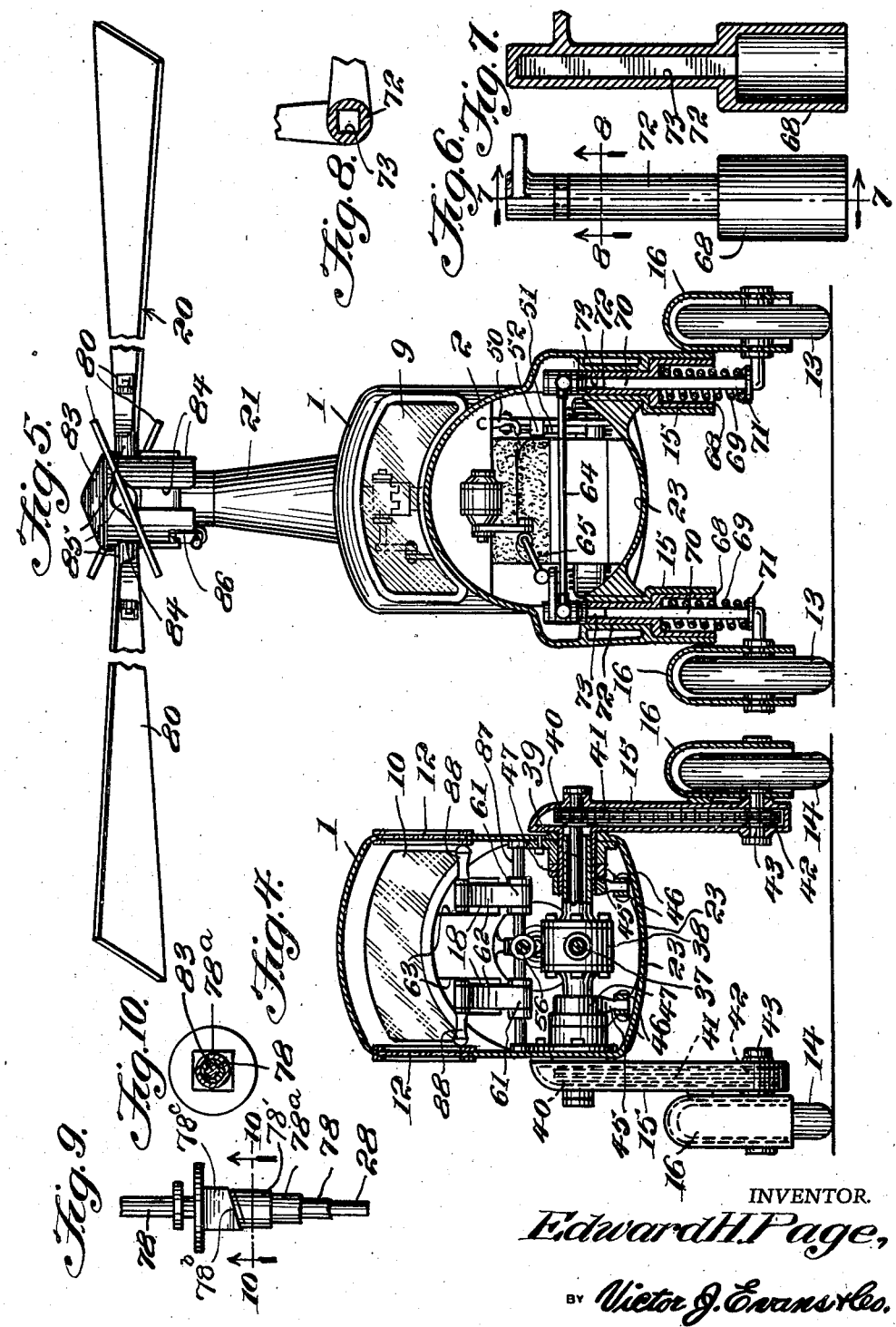

2,424,769

UNITED STATES PATENT OFFICE 2,424,769

HELICOPTER HAVING FOLDING ROTOR

Edward H. Page, Middleburgh, N. Y.

Application March 5, 1945, Serial No. 580,993

2 Claims. (Cl. 244—17)

My present invention, in its broad aspect, has to do with improvements in a combined vehicle designed to function either as an aircraft or a ground vehicle and which has overhead propellers capable of being extended or folded depending on whether the vehicle is to be used to traverse the air or the ground, and which has means for changing the propeller pitch and feathering the same to vary the lift. When used as either an air or a ground traversing vehicle, my device has a pusher propeller and rudders, in addition to ground traction wheels which are driven from the power plant and which are used as landing gear or wheels when used as an aircraft. I have a central power plant with radial cylinders for driving all parts of my device, and clutch mechanism to operate or disconnect the respective elements. The fuselage, cabin or body of my device is designed for either air transportation or ground transportation, and machine guns and other armament equipment may be conveniently operated from the cabin, and suitable means, convenient to the operator, are provided for steering and controlling the same either in the air or on the ground, and the device is fully streamlined.

My device may be used in taking off or landing on a highway and in traversing a highway after the manner of an automobile and the fuselage or cabin is roomy, convenient and streamlined, and when not in use, the propellers are folded back to be out of the way and so as not to interfere with the operation of my device; furthermore, my device has four wheels to traverse a highway or the like and the front wheels are equipped for steering while the rear wheels are equipped as driving wheels, and the four wheels give a four point landing contact with suitable shock compensation devices when the device is used as an aircraft. The fuselage or cabin provides universal visibility fore, aft and to the sides and all controls are handy to the operator.

Other and equally important objects and advantages of my invention will be apparent from the following description and drawings, but it is to be understood that changes in form, size, shape, materials, and construction and arrangement of parts is permissible and within the purview of my broad inventive concept and the scope of the appended claims.

In the drawings wherein I have illustrated a preferred form of my invention:

Figure 2 is a longitudinal section of my device with the propeller blades extended to be used as an aircraft;

Figure 3 is a top plan view, partly broken away;

Figure 4 is a section on the line 4—4 of Figure 2;

Figure 5 is a section on the line 5—5 of Figure 2;

Figure 6 is a detail view of one of the shock absorbing cylinders of the landing and ground wheels;

Figure 7 is a section on the line 7—7 of Figure 6;

Figure 8 is a section on the line 8—8 of Figure 6;

Figure 9 is a detail of the steering column;

Figure 10 is a section on the line 10—10 of Figure 9;

Figure 11 is a detail of the propeller drive column;

Figure 12 is a section on the line 12—12 of Figure 11;

Figure 13 is a transverse section through the propeller mounts, and shows the locking cowl for holding the propeller blades extended;

Figure 14 is a transverse section through the propeller mounts, and shows the locking cowl with the propeller blades folded back;

Figure 15 is a front elevation of my device;

Figure 16 is a detail view of the control lever or spring lever for feathering the propeller blades;

Figure 17 is a section through the control lever or spring lever and toothed disk;

Figure 18 is a detail of the blade locking cowl latch;

Figure 19 is an enlarged detail to show the manner of latching the cowl;

Figure 20 is a detail of the operation of the shift lever for moving the various elements of my device into and out of action;

Figure 21 is a detail showing the position of the lever with the propellers in action and drive wheels in neutral;

Figure 22 is a detail showing the position of the lever with both the propellers and drive wheels in neutral; and Figure 23 is a detail showing the position of the lever with the propeller out of action and the drive wheels operative.

In the drawings, wherein like characters of reference are used to designate like or similar parts throughout the several views:

Figure 1:
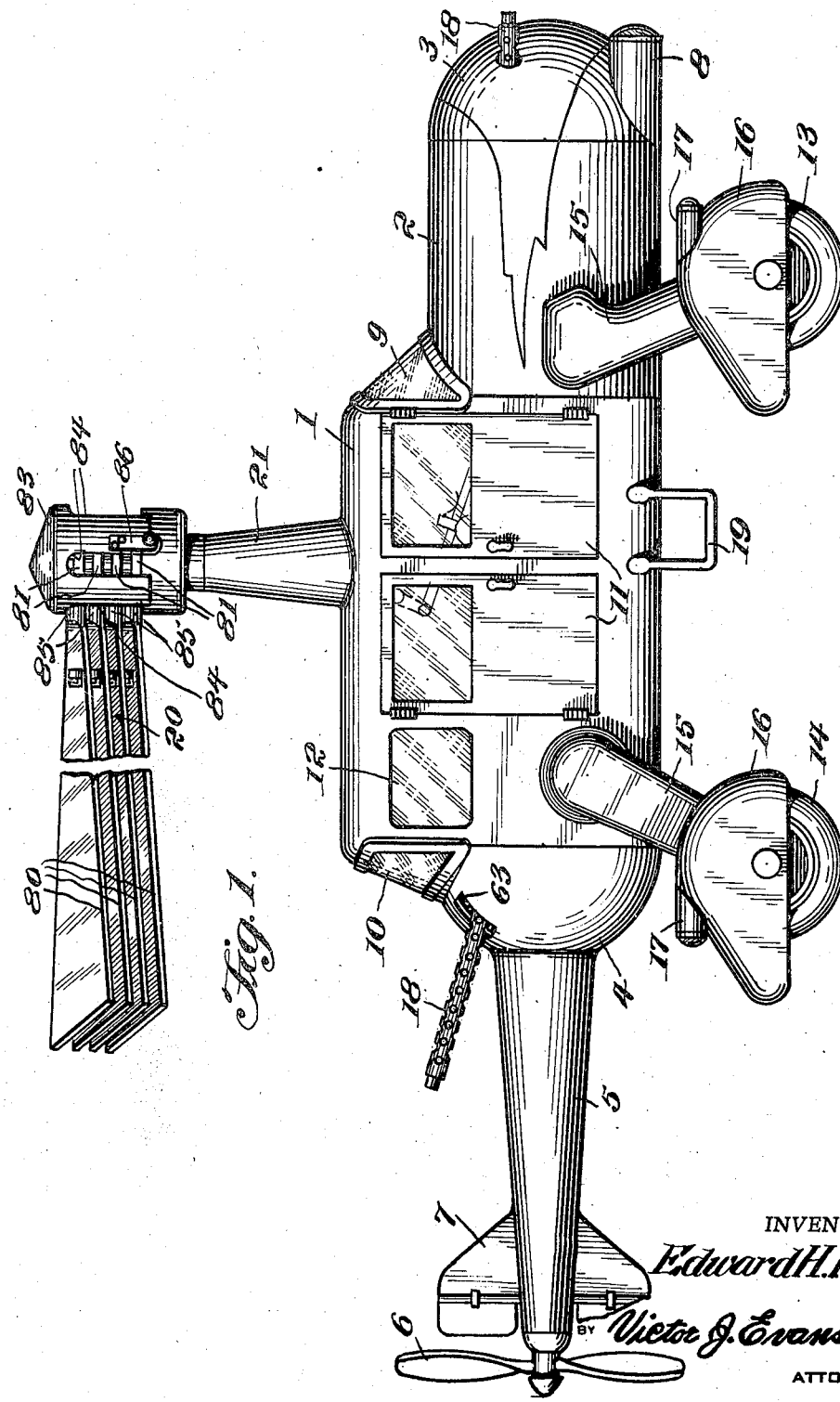
Figure 1 is a side view of my device with the propeller blades folded back and the device used as a ground traversing vehicle.

The numeral 1 designates the fuselage, cabin, or body of my device, which has an elongated forward extension 2, or nose, suitably rounded off as at 3 and streamlined, and a semi-cylindrical rear formation 4 leading into the tapered tail structure 5 on which is mounted the rear pusher propeller 6 and the rudders 7. Headlights 8 are provided on the nose, and the fuselage or cabin has a windshield 9, a rear window 10, doors 11 and side windows 12. The landing gear or traction elements include forward wheels 13 on the nose, and rear wheels 14 on the rear of the body. The forward wheels are inclined forwardly and the rear wheels backwardly, and all wheels have streamlined housings 15 and wheel or mud guards 16 and riding lights 17. Suitable implements of armament, such as machine guns 18 project from the nose and the semi-cylindrical back of the body, and a step 19 is provided for entering the fuselage. The vertical lift propellers 20 are carried on a vertical standard 21 extending upwardly from the top, and a pilot's or driver's seat 22 is conveniently mounted in the interior and may be supported from the floor 23.

Mounted on a base 24 attached to the floor 23 of the fuselage or body 1 is a radial motor 25 having a circular housing and exhaust 26 and cylinders 27. The motor has a vertical drive or stub shaft 28 extending up through the standard 21 and mounted in a bearing 29. The shaft has a beveled drive pinion 30.

In mesh with the pinion 30 is a driven pinion 31 on a shaft 32 leading to the transmission 33 which has a drive gear 34 on a shaft 35. The drive gear 34 is in mesh with a driven gear 36 on a shaft 37 leading to the differential 38 from which the rear wheel drive shaft 39 extends to drive the rear wheels through gears 40, chains 41 and gears 42 on the stub axles 43 of wheels 14—see Figure 4. A shock cylinder 44 having levers 45 and links 46 connecting the same to rear axle journals 47 cushion the rear wheels and operating structure from shocks. A clutch assembly 48 on the shaft 37 is operated through rod 49 and hand lever 50 to throw the rear wheels into and out of gear depending on whether the device is to be used to traverse a roadway or not, and a notched segment 51 engaged by the dog 52 holds the lever 50 in adjusted position.

Connected by a rod 53 also connected with the lever 50 above its fulcrum 54 is a clutch 55 to the universally mounted drive shaft 56 to the rear propeller shaft 57, which shaft is mounted in trussed steady bearings 58 and has an end bearing 59. Consequently, when the hand lever is thrown in one direction, the rear propeller is in gear with the motor, and when thrown in the other the rear wheels are in gear with the motor, depending in use on whether the device is to be used as an airplane or to traverse a roadway after the manner of an automobile. The transmission may be thrown in or out by hand lever 60.

The two forward machine guns 18 are pivotally mounted on shafts 18a in carriages 18b at each side of the operator, which shafts are engaged with the magazines 62, and slots 63 are provided for adjusting their aim.

To steer the front wheels 13, I provide a radius rod 64 with links 65 to the steering column 66 of the steering wheel 67 adjacent the pilot's seat 22.

Since the front and rear wheels 13 and 14 are used as landing gear when my device is used as an airplane, I provide cylinders 68 in housings 15 carrying springs 69 about the wheel axle supporting square rods 70 to each wheel, such springs bearing against and having their ends welded to stop collars 71 at the bottom and against the heads of the cylinders at the top so that the wheels are normally extended, but may have limited cushioned upward movement against the tension of springs 69. Cylinders 68 have reduced vertical parts 72 with square bores 73 slidably supporting rods 70 and the radius rod is connected to the cylinders to steer the front wheels.

A clutch 74 on the vertical drive or stub shaft 28 is connected by link 75 and lever 76 to clutch shift handle 77 to connect the hollow vertical lift propeller drive shaft 78 with the motor 25. Mounted about the drive shaft 78 is a sleeve 78a formed with one element of a feathering cam 78', the other element 78b of which is formed on an operating member 78c. A lever 79 to turn the blades for feathering is carried by sleeve 78a. The propeller blades 80 are mounted on independent hubs 81 by angular arms 82 and the hubs are driven by shaft 78, but they may all be demounted and turned back to lie one above the other as shown in Figures 1 and 14 to be out of the way when the device is used to traverse a roadway. When extended to be used as an aircraft—as in Figures 2 and 13, a cowl 83 with slots 84 is fixed over the shanks 85 of the blades to securely hold them in place, and a latch 86 is provided to hold the cowl in place. A shaft 87 on which are mounted gun operating and aiming levers 88 have handles 89—see Figure 4—for aiming the machine guns 18 from a point convenient to the pilot. By turning the lever 79, the angle of the blade may be changed through element 78' engaging element 78b.

Referring to Figures 20 to 23, when it is desired to operate my device as an airplane, the handle 50, to which are connected rods 49 and 53 operating clutch elements 48 and 55, is moved to the position 1 of Figure 20 which throws clutch 55 in, and clutch 48 out, and disconnects the drive wheels and connects the propeller for operation. Position 2 of Figure 20 for the handle 50 is the neutral portion with both clutch 55 and 48 disconnected, and position 3 of Figure 20 for the handle disconnects clutch 55 and connects clutch 48 to the drive wheels 14, and disconnects the propeller.

The lever 79 for feathering the propeller blades 80 is essentially a spring lever and fits in slots or notches in the segmental rack 89 where it may be moved to various positions to change the angle of the blades through movement of the cam elements 78' and 78b.

From the foregoing, it is believed that the operation and advantages of my invention will be apparent, but it is again emphasized that interpretation of the scope of my invention should only be conclusive when made in the light of the subjoined claims.

I claim:

1. A folding rotor for a combined aircraft and ground vehicle having a fuselage, a standard projecting upwardly from said fuselage, a prime mover mounted in the fuselage, a hollow driving shaft extending through said standard and driven by said prime mover through a stub shaft and clutch, comprising a plurality of radial arms, means independently mounting them for rotation upon said driving shaft, a propeller blade rotatably mounted on each of said radial arms whereby said propeller blades may be either spaced equally about said driving shaft or be stacked into vertical alignment to lie one above the other, a cowl removably secured to said driving shaft and provided with a plurality of circumferentially spaced slots adapted to receive and fix said propeller blades in equal spaced angular position from each other in respective slots of said cowl to be driven thereby as a vertical lift propeller for sustaining said fuselage off the ground or in stacked vertical aligned position within a single slot, and latch means for releasably holding said cowl against rotating movement relative to the driving shaft when said blades are in stacked vertical aligned position.

2. The structure of claim 1, and a sleeve extending concentrically with the driving shaft, manual means for angularly adjusting said sleeve, a plate slidably supported on the driving shaft and slidably and non-rotatively mounted in said standard, cam means on said plate and sleeve, respectively, whereby angular movement of said sleeve will cause said plate to move axially of the driving shaft, and radial arms extending from said propeller blades and slidably engaging said plate whereby axial movement of said plate relative to the driving shaft will rotate said propeller blades to vary the pitch of the vertical lift propeller.

EDWARD H. PAGE.

REFERENCES CITED

The following references are of record in the file of this patent:

UNITED STATES PATENTS

| Number | Name | Date |
|---|---|---|
| 2,135,073 | Gerhardt et al. | Nov. 1, 1938 |
| 2,103,881 | Wagner | Dec. 28, 1937 |
| 2,174,946 | Ray et al. | Oct. 3, 1939 |